United States Patent Office 3,318,836
Patented May 9, 1967

3,318,836
VINYL PLASTISOLS STABILIZED WITH
ALIPHATIC ALCOHOLS
Samuel Francis Joyce III, Ballwin, Mo., assignor to Monsanto Company, St. Louis, Mo., a corporation of Delaware
No Drawing. Filed Feb. 25, 1965, Ser. No. 435,334
19 Claims. (Cl. 260—31.8)

This invention relates to plastisols and specifically to a method for reducing the viscosity of plastisols as well as the plastisol compositions.

"Plastisol" is a term adapted by the art to which this invention pertains to designate a colloidal dispersion of vinylidene halide polymer of microscopic ultimate particle size in liquid plasticizers therefor. It is 100% total solid material and is not to be confused with organosols which contain volatile solvents or thinners (Modern Plastics, vol. 29, page 87, December 1951).

Plastisols are prepared by dispersing the solid vinylidene halide polymer in a liquid plasticizer by means which are well known to those skilled in the art, as for example by the use of paint mixers, pony mixers or common agitation equipment. At the same time pigments, fillers and like compounding materials are usually incorporated. The resultant compounded plastisols are of a viscous nature and in appearance vary from viscous liquids to pasty materials.

The plastisols are frequently employed in making hollow molded elastomeric articles of various wall thicknesses. This is accomplished either by placing the plastisol in a hollow mold or by dipping a one-piece male mold into the plastisol. Plastisols are also employed in the "no-mold" molding technique, as for example in covering automotive light socket assemblies a with a snug dust and water resistant removable cover by simply immersing the assembly in a plastisol to the proper depth. The plastisol coating resulting from any of these molding techniques is fused to an elastomeric compound by heating while in or on the mold. The usual fusion or fluxing temperature of plastisols is the range of 300° F. to 400° F., the fusing or fluxing of the component parts is practically instantaneous. Upon cooling, the finished molded articles can be removed from the mold and are ready for use, or in the case of a coated assembly, the assembly is ready for installation or packing.

It is apparent that for optimum use in molding, the plastisols must have an element of fluidity so that they can be poured, sucked or pumped into molds or so that they will flow around articles to be coated. Usually, when freshly prepared, the viscous liquid plastisols, that is those containing about 60 to 150 parts by weight of plasticizer for each 100 parts by weight of resin, are sufficiently fluid so that they can be employed to fill molds, or in the dip molding process.

However, the viscosity of such liquid plastisols increases on standing. This increase in viscosity means that the plastisol can no longer be sucked or poured into molds or that a greatly increased power input is required to pump them into molds. This increase occurs in but a few days after being prepared as hereinafter will be demonstrated.

The pasty plastisols, that is those containing from about 25 to about 60 parts by weight of plasticizers per 100 parts by weight of resin, are used in molding and also increase in viscosity on standing. When they are used in dip molding, pasty plastisols of increased viscosity produce a nonuniform and uneven coating. Although plastisols having a viscosity above 20,000 centipoises have been used, those having a viscosity substantially below 20,000 are certainly preferred, e.g. 10,000 to 12,000 centipoises at 25° C.

Since molding with a plastisol is intended to provide an inexpensive rapid method for producing a uniformly tailored molded protective coating at low cost, it is extremely important that the viscosity of the plastisol be maintained with reasonably usable values even after the plastisol is seven to fourteen days old. When the viscosity increases beyond the usable limit, it is apparent that the user thereof will suffer a loss or be put to additional expense in returning the plastisol to a usable material. Thus, it is readily apparent that a plastisol which does not change appreciably in viscosity even after being stored for as long as two weeks would be an exceedingly useful composition.

In accordance with this invention it has been found that the useful life of a plastisol containing a primary liquid plasticizer can be substantially increased by dissolving therein 0.5 to 10 parts by weight per 100 parts by weight of resin of an monohydric aliphatic alcohol having 1 to 18 carbon atoms and preferably having 4 to 14 carbon atoms.

As illustrative of the monohydric aliphatic alcohols contemplated by this invention are methyl alcohol, ethyl alcohol, propyl alcohol, isopropyl alcohol, n-butyl alcohol, isobutyl alcohol, sec-butyl alcohol, tert.-butyl alcohol, n-amyl alcohol, iso-amyl alcohol, n-hexyl alcohol, isohexyl alcohol, 2-ethylhexyl alcohol, n-octyl alcohol, isooctyl alcohol, isononyl alcohol, decyl alcohol, isodecyl alcohol, dodecyl alcohol, tridecyl alcohol, tetradecyl alcohol, pentadecyl alcohol, octadecyl alcohol, etc.

The pasticizers which are useful in the compositions of this invention are those which will not dissolve the dispersion type resin at ordinary temperatures, but which will dissolve the resin at elevated temperatures and form a gel on cooling. Plastizers which are commonly employed in the preparation of plastisols, frequently referred to as primary liquid plasticizers, include for example: the diesters of phthalic acid, such as dibutyl phthalate, diisobutyl phthalate, butyl benzyl phthalate, isobutyl benzyl phthalate, diamyl phthalate, di-(2-ethylhexyl) phthalate, isobutyl octyl phthalate, isobutyl isodecyl phthalate, butyl isodecyl phthalate, diisooctyl phthalate, di-(n-octyl) phthalate, and mixtures thereof; the triaryl phosphates such as triphenyl phosphate, tricresyl phosplate, and cresyl diphenyl phosphate; the alkyl aryl phosphates having from 6 to 18 carbon atoms in the alkyl groups, such as hexyl diphenyl phosphate, 2-ethylbutyl diphenyl phosphate, octyl diphenyl phosphate, 2-ethylhexyl diphenyl phosphate, isooctyl diphenyl phosphate, nonyl diphenyl phosphate, decyl diphenyl phosphate, 2-butyloctyl diphenyl phosphate, tridecyl diphenyl phosphate, tetradecyl phenyl phosphate, octadecyl diphenyl phosphate, 2-ethylbutyl dicresyl phosphate, n-octyl dicresyl phosphate, isooctyl dicresyl phosphate, 2-ethylhexyl dicresyl phosphate, nonyl dicresyl phosphate, decyl dicresyl phosphate, 2-n-propylheptyl dicryesyl phosphate, 2-butyl octyl dicresyl phosphate, tridecyl dicresyl phosphate, tetradecyl dicresyl phosphate, and octadecyl dicryesyl phosphate; the liquid esters of aliphatic dicarboxylic acids such as dibutyl sebacate, dihexyl adipate, di(1,3-dimethyl butyl) adipate, dinonyl adipate, octyldecyl adipate; the chlorophthalates, such as di(2-ethylhexyl) monochlorophthalate and di(2-ethylhexyl) dichlorophthalate; other high boiling esters and the like. These plasticizers may be mixed with each other or with one or more secondary plasticizers, such as the hydrocarbon types, which are well known to those skilled in the art of preparing plastisols.

The vinylidene halide resins which can be used in accordance with this invention includes, among others, dispersion type resins derived from such vinylidene compounds as vinyl chloride, vinylidene chloride, etc. and copolymers of such vinylidene compounds with other ethylenically unsaturated monomers copolymerizable therewith, for example, copolymers of a vinylidene halide such as vinyl chloride with such materials as vinylidene chloride, vinyl esters of carboxylic acids, e.g. vinyl acetate, vinyl propionate, vinyl butyrate, vinyl benzoate; esters of unsaturated acids, e.g. alkyl acrylates, such as methyl acrylate, ethyl acrylate, propyl acrylate, butyl acrylate, allyl acrylate and the corresponding esters of methacrylic and ethacrylic acids; vinyl aromatic compounds, e.g. styrene, ortho-chlorostyrene, parachlorostyrene, 2,5-dichlorostyrene, 2,4-dichlorostyrene, para-ethyl styrene, divinyl benzene, vinyl naphthalene, alpha methyl styrene; unsaturated amides, such as acrylic acid amides, acrylic acid anilide; unsaturated nitriles, such as acrylonitrile, methacrylonitrile; esters of $\alpha,\beta$-ethylenically unsaturated carboxylic acids, e.g., the methyl, ethyl, propyl, butyl, isobutyl, amyl, hexyl, heptyl, octyl, allyl, methallyl and phenyl monoesters and diesters of maleic, crotonic, itaconic, fumaric acids and the like. The class of copolymers in which a predominant proportion, i.e. more than 50% by weight of the monomer units are vinyl chloride units, any balance being monomer, represents a preferred class of resins to be in the compositions of this invention.

The monohydric aliphatic alcohols of this invention are also effective in plastisols of vinylidene halide resins containing halogens other than chlorine, e.g. bromine, iodine and fluorine.

The above vinylidene halide-containing dispersion type resins and their preparation are well known to those skilled in the art. They are usually prepared by a conventional aqueous emulsion polymerization technique which produces a latex-like dispersion from which the polymer can be isolated by spray drying or by coagulation or flocculation process as a fine powder wherein usually 95% of the particles are with ±0.05 micron of the mean particle size. Halogen-containing dispersion type resins having an average particle size in a wide range, as for example from about 0.05 to about 200 microns, may be employed in practicing this invention, however, the use of powdery halogen-containing resins having an average particle size of from 0.05 to about 30 microns is preferred. Powdery dispersion type resins having a particle size less than 0.05 micron tend to dissolve readily in the plasticizer and cause the plastisol to gel. Powdery dispersion resins having an average particle size greater than about 30 microns tend to form grainy plastisols.

The following examples are intended to be illustrative of the present invention and are not intended as a limitation thereon. In these examples, all parts are parts by weight.

Plastisol compositions are prepared by stirring together in weight proportion set forth below a dispersion type halogen-containing resin having an average particle size of 2.29 microns, a primary liquid plasticizer therefor and a monohydric aliphatic alcohol.

The viscosities of the composition set forth above at 23° C. are obtained on a Brookfield Model HAT viscometer using a No. 6 spindle at 50 r.p.m. The viscosity in poises of the various compositions is set forth in Table II below for the listed periods of time.

TABLE II.—VISCOSITY OF PVC PLASTISOLS IN POISES

| Composition | 2 Hours | 1 Day | 7 Days | 14 Days |
|---|---|---|---|---|
| A | 86 | 102 | 112 | 112 |
| B | 114 | 132 | 138 | 142 |
| C | 86 | 108 | 154 | 166 |
| D | 50 | 60 | 86 | 98 |
| E | 39 | 48 | 70 | 80 |
| F | 76 | 82 | 108 | 110 |
| G | 88 | 78 | 93 | 89 |
| H | 88 | 80 | 98 | 98 |
| I | 78 | 71 | 74 | 76 |
| J | 58 | 78 | 108 | 122 |
| K | 72 | 83 | 124 | 118 |
| L | 76 | 86 | 110 | 127 |
| M | 82 | 90 | 126 | |
| N | 90 | 108 | | |
| O | 100 | 102 | | |

While this invention has been described with respect to certain embodiments it is not so limited and it is to be understood that variations and modifications thereof may be made which are obvious to those skilled in the art without departing from the spirit or scope of this invention.

What is claimed is:
1. An improved plastisol which comprises a vinylidene polymer of particle size in the range of about 0.05 micron to about 200 microns selected from the group consisting of homopolymers of vinylidene chloride and copolymers of vinylidene chloride with ethylenically unsaturated monomers copolymerizable therewith containing at least 50% by weight of vinylidene chloride, homopolymers of vinyl chloride and copolymers of vinyl chloride with ethylenically unsaturated monomers copolymerizable therewith containing at least 50% by weight of vinyl chloride dispersed in from about 25 to about 150 parts per 100 parts by weight of polymer of a primary liquid plasticizer therefor and from about 0.5 to about 10 parts per 100 parts by weight of polymer of a monohydric aliphatic alcohol having from 1 to 18 carbon atoms.

2. An improved plastisol which comprises a vinylidene polymer of particle size in the range of about 0.05 micron to about 30 microns selected from the group consisting of homopolymers of vinylidene chloride and copolymers of vinylidene chloride with ethylenically unsaturated monomers copolymerizable therewith containing at least 50% by weight of vinylidene chloride, homopolymers of vinyl chloride and copolymers of vinyl chloride with ethylenically unsaturated monomers copolymerizable therewith containing at least 50% by weight of vinyl chloride dispersed in from about 50 to about 100 parts per 100 parts by weight of polymer of a primary liquid plasticizer therefor and from about 0.5 to about 10 parts per 100 parts by weight of polymer of a monohydric aliphatic alcohol having from 1 to 18 carbon atoms.

3. The composition of claim 2 wherein the chlorinated vinylidene polymer contains at least 50% by weight vinyl chloride.

4. The composition of claim 2 wherein the chlorinated vinylidene polymer is a vinyl chloride-vinyl acetate co-

TABLE I

| Composition | A | B | C | D | E | F | G | H | I | J | K | L | M | N | O |
|---|---|---|---|---|---|---|---|---|---|---|---|---|---|---|---|
| Polyvinyl chloride | 100 | 100 | 100 | 100 | 100 | 100 | 100 | 100 | 100 | 100 | 100 | 100 | 100 | 100 | 100 |
| Di-2-ethylhexyl phthalate | 65 | | | 61.8 | 61.8 | 63 | 63 | 63 | 58.5 | | | | | | |
| Butyl benzyl phthalate | | 65 | | | | | | | | 61.8 | 58.5 | | | 63 | 63 |
| 2-ethylhexyl diphenyl phosphate | | | 65 | | | | | | | | | 61.9 | 63 | | |
| 2-ethylhexyl alcohol | | | | 3.2 | | | | | | 3.2 | 3.1 | | | | |
| n-Hexyl alcohol | | | | | 2.0 | | | | | | | | | 2.0 | |
| n-Butyl alcohol | | | | | | 3.2 | | | | | | | | | |
| Isodecyl alcohol | | | | | | | 2.0 | | 6.5 | | 6.5 | | 2.0 | | |
| Tridecyl alcohol | | | | | | | | 2.0 | | | | | | | 2.0 | polymer containing at least 50% by weight vinyl chloride.

5. An improved plastisol which comprises a vinyl chloride homopolymer dispersed in from about 25 to about 150 parts per 100 parts by weight of polymer of a primary liquid organic plasticizer therefor, which is a non-solvent for the polymer at room temperature and a solvent at elevated temperatures, and from about 1 to about 10 parts per 100 parts by weight of polymer of a monohydric aliphatic alcohol having from 1 to 18 carbon atoms.

6. An improved plastisol which comprises polyvinyl chloride which has an average particle size in the range of 0.02 to 5.0 microns, dispersed in a liquid polybasic acid ester plasticizer therefor, the weight proportions being in the range of from 50 to 100 parts of plasticizer per 100 parts of polymer, and from about 1 to about 10 parts per 100 parts of polymer of a monohydric aliphatic alcohol having from 1 to 18 carbon atoms.

7. The composition of claim 6 wherein the plasticizer is a liquid diester of phthalic acid whose ester groups contain a total of at least eight carbon atoms.

8. The composition of claim 7 wherein the plasticizer is di-(2-ethylhexyl) phthalate.

9. The composition of claim 6 wherein the monohydric aliphatic alcohol is 2-ethylhexyl alcohol.

10. The composition of claim 6 wherein the monohydric aliphatic alcohol is isodecyl alcohol.

11. The composition of claim 6 wherein the monohydric aliphatic alcohol is tridecyl alcohol.

12. The composition of claim 6 wherein the monohydric aliphatic alcohol is n-hexyl alcohol.

13. The method of preparing a plastisol having a reduced tendency to increase in viscosity which comprises dispersing a vinylidene polymer, selected from the group consisting of vinylidene chloride homopolymers, copolymers of vinylidene chloride with ethylenically unsaturated monomers copolymerizable therewith containing at least 50% by weight of vinylidene chloride, vinyl chloride homopolymers, and copolymers of vinyl chloride with ethylenically unsaturated monomers copolymerizable therewith containing at least 50% by weight of vinyl chloride, in a mixture comprising from about 25 to about 150 parts per 100 parts by weight of polymer of a primary liquid plasticizer for said polymer and from about 1 to about 10 parts per 100 parts by weight of polymer of a monohydric aliphatic alcohol having from 1 to 18 carbon atoms.

14. The method of preparing a plastisol having a reduced tendency to increase in viscosity which comprises dispersing a vinyl chloride homopolymer in a mixture comprising a primary liquid organic plasticizer which is a non-solvent for the polymer at room temperature and a solvent at elevated temperatures of a monohydric aliphatic alcohol having from 1 to 18 carbon atoms.

15. The method of preparing a plastisol having a reduced tendency to increase in viscosity which comprises dispersing polyvinyl chloride which has an average particle size in the range of 0.02 to 5.0 microns, in a mixture comprising a primary liquid organic plasticizer for said polymer, the weight proportions being within the range of from 50 to 100 parts of plasticizer per 100 parts of polymer, and from about 1 to about 10 parts per 100 parts of polymer of a monohydric aliphatic alcohol having from 1 to 18 carbon atoms.

16. The method of claim 15 wherein the plasticizer is di-(2-ethylhexyl) phthalate and the monohydric aliphatic alcohol is isodecyl alcohol.

17. The method of claim 15 wherein the plasticizer is 2-ethylhexyl diphenyl phosphate and the monohydric aliphatic alcohol is 2-ethylhexyl alcohol.

18. The method of claim 15 wherein the plasticizer is butyl benzyl phthalate and the monohydric aliphatic alcohol is isodecyl alcohol.

19. The method of claim 15 wherein the plasticizer is 2-ethylhexyl phthalate and the monohydric aliphatic alcohol is n-butyl alcohol.

References Cited by the Examiner

FOREIGN PATENTS 627,884  8/1949  Great Britain.

OTHER REFERENCES

Payen: Organic Coating Technology, vol. II; John Wiley & Sons, Inc., 1961, page 1242.

MORRIS LIEBMAN, *Primary Examiner.*

L. T. JACOBS, *Assistant Examiner.*